(12) United States Patent
Awano et al.

(10) Patent No.: US 9,016,424 B2
(45) Date of Patent: Apr. 28, 2015

(54) VEHICLE FRONT STRUCTURE

(71) Applicant: Honda Motor Co., Ltd., Tokyo (JP)

(72) Inventors: Katsuyuki Awano, Wako (JP); Tomoya Yabu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/193,118

(22) Filed: Feb. 28, 2014

(65) Prior Publication Data

US 2014/0246260 A1  Sep. 4, 2014

(30) Foreign Application Priority Data

Mar. 4, 2013  (JP) ................................. 2013-041533

(51) Int. Cl.
*B62D 21/11* (2006.01)
*B62D 21/15* (2006.01)
*B62D 25/08* (2006.01)
*B62D 3/12* (2006.01)

(52) U.S. Cl.
CPC .............. *B62D 21/11* (2013.01); *B62D 25/082* (2013.01); *B62D 3/12* (2013.01)

(58) Field of Classification Search
CPC ..................... B60G 2204/15; B60G 2206/604; B62D 21/11; B62D 21/15; B62D 21/152; B62D 21/153; B62D 25/082
USPC ........... 180/274, 311, 312; 280/784, 124.109, 280/779; 296/187.08, 187.09, 193.07, 296/193.09, 204, 203.02
See application file for complete search history.

(56) References Cited

U.S. PATENT DOCUMENTS

| | | | | |
|---|---|---|---|---|
| 6,502,659 B2 * | 1/2003 | Akasaka | ....................... | 180/309 |
| 6,595,312 B2 * | 7/2003 | Yoshioka | ....................... | 180/296 |
| 7,393,016 B2 * | 7/2008 | Mitsui et al. | ................... | 280/784 |
| 7,669,688 B2 * | 3/2010 | Yamaguchi et al. | .......... | 180/312 |
| 7,740,278 B2 * | 6/2010 | Kakuta et al. | ................. | 280/777 |
| 7,771,137 B2 * | 8/2010 | Anzai et al. | ................ | 403/379.3 |
| 7,976,037 B2 * | 7/2011 | Yoshida et al. | ........ | 280/124.109 |
| 8,646,792 B2 * | 2/2014 | Young et al. | ........... | 280/124.109 |
| 2013/0200653 A1 * | 8/2013 | Yasui et al. | .............. | 296/187.08 |

FOREIGN PATENT DOCUMENTS

| | | | | | |
|---|---|---|---|---|---|
| JP | 05077737 A | * | 3/1993 | ............... | B62D 3/02 |
| JP | 2008-56129 A | | 3/2008 | | |
| JP | 2009161107 A | * | 7/2009 | | |
| JP | 2010132180 A | * | 6/2010 | | |

* cited by examiner

*Primary Examiner* — Paul N Dickson
*Assistant Examiner* — Laura Freedman
(74) *Attorney, Agent, or Firm* — Westerman, Hattori, Daniels & Adrian, LLP (57) ABSTRACT

A vehicle front structure includes left and right side frames and a sub-frame disposed below the left and right side frames. The sub-frame includes a cross member, which connects rear end portions of left and right side members, and a support unit, which supports a steering gear box at front end portions of the left and right side members. The steering gear box is supported by the support unit so as to be located in a vehicle-front-side region of the power plant. The support unit is capable of being broken by an impact load so that the steering gear box is dropped when the impact load is applied.

21 Claims, 12 Drawing Sheets

VEHICLE FRONT STRUCTURE

CROSS REFERENCES TO RELATED APPLICATIONS

The present application claims priority under 35 U.S.C. §119 to Japanese Patent Application No. 2013-41533, filed Mar. 4, 2013, entitled "Vehicle Front Structure." The contents of this application are incorporated herein by reference in their entirety.

TECHNICAL FIELD

The present disclosure relates to a vehicle front structure in which a steering gear box is provided on a sub-frame and in which a power plant extends to a region above the sub-frame.

BACKGROUND

Vehicle front structures are known in which left and right front side members extend in a vehicle front-rear direction, in which left and right extending portions extend inward in a vehicle width direction from intermediate portions of the left and right front side members, and in which a steering gear box extends between the left and right extending portions (see, for example, Japanese Unexamined Patent Application Publication No. 2008-56129).

Since the steering gear box extends between the left and right extending portions, the steering gear box functions as a cross member. Accordingly, the cross member can be omitted, and the weight of the vehicle can be reduced.

The steering gear box according to Japanese Unexamined Patent Application Publication No. 2008-56129 extends in the vehicle width direction along a dashboard. The dashboard separates an engine room and a vehicle cabin from each other. Accordingly, a power plant is located further toward the vehicle front end than the dashboard and the steering gear box.

The power plant is, for example, an engine-transmission unit in which an engine and a transmission are integrated together.

In the vehicle front structure according to Japanese Unexamined Patent Application Publication No. 2008-56129, the steering gear box is located further toward the vehicle rear end than the power plant. Therefore, when an impact load is applied to the vehicle front end, a movement of the power plant toward the vehicle rear end may be stopped by the steering gear box.

Thus, it is difficult to allow the power plant to move toward the vehicle rear end by a sufficient distance, and this makes it difficult to sufficiently absorb the impact load.

SUMMARY

It would be preferable to provide a vehicle front structure with which the weight of the vehicle can be reduced and the impact load can be sufficiently absorbed.

A vehicle front structure according to an aspect of the present disclosure includes left and right side frames; a sub-frame disposed below the left and right side frames; a steering gear box provided on the sub-frame; and a power plant that extends to a region above the sub-frame. The sub-frame includes left and right side members that extend in a vehicle front-rear direction, a cross member that connects vehicle-rear-side portions of the left and right side members, and a support unit that supports the steering gear box at front end portions of the left and right side members so that the steering gear box is located in a vehicle-front-side region of the power plant. The support unit is capable of being broken by an impact load so that the steering gear box is dropped when the impact load is applied.

The steering gear box is supported by the support unit at the front end portions of the left and right side members. The steering gear box is a rigid component.

Therefore, the steering gear box can be used as a front cross member of the sub-frame. Accordingly, the front cross member can be omitted from the sub-frame, and the weight of the vehicle can be reduced.

The steering gear box is located in the vehicle-front-side region of the power plant, and the support unit can be broken by the impact load so that the steering gear box is dropped to a position below the power plant and the sub-frame.

When the steering gear box is dropped, the impact load is not supported by the steering gear box. Therefore, when the impact load is applied to the vehicle front structure, the impact load can be efficiently transmitted to the power plant.

As a result, the power plant can be moved toward the vehicle rear end by a sufficient distance, and the impact load can be sufficiently absorbed.

Preferably, the support unit includes left and right support portions that extend inward in a vehicle width direction from the front end portions of the left and right side members, respectively. Each support portion includes a gear-box attachment portion to which the steering gear box is attached and a load receiving portion which receives the impact load, the gear-box attachment portion and the load receiving portion being located further toward an inside in the vehicle width direction than the side member on which the support portion is provided. Each support portion is broken by the impact load applied to the load receiving portion.

Since the load receiving portion is located further toward the inside in the vehicle width direction than the corresponding side member, the load receiving portion can be offset (shifted) from the corresponding side member. Therefore, the impact load applied to the load receiving portion can be efficiently used as a load for breaking the support portion.

Accordingly, each support portion can be appropriately broken by the impact load, and the steering gear box can be reliably dropped to a position below the power plant and the sub-frame.

The load receiving portion may be located on outer side of the gear-box attachment portion in the vehicle width direction.

When the impact load is applied to the load receiving portion, each support portion is probably broken at the load receiving portion or a portion around the load receiving portion.

Therefore, when the load receiving portion is located on outer side in the vehicle width direction of the gear-box attachment portion, the gear-box attachment portion can be reliably separated from the front end portion of the corresponding side member when the support portion (that is, the load receiving portion or a portion around the load receiving portion) is broken.

Accordingly, the steering gear box can be more reliably dropped to a position below the power plant and the sub-frame by the impact load.

The vehicle front structure may further include a support member that is connected to the load receiving portion such that the impact load is transmittable to the load receiving portion, the support member including a connection bar that is located further toward a vehicle front end than the steering gear box and extends in the vehicle width direction.

In this case, the impact load can be transmitted to the load receiving portion and each support portion can be broken before the impact load is transmitted to the steering gear box. As a result, the steering gear box can be reliably dropped to a position below the power plant and the sub-frame by the impact load.

Preferably, the steering gear box or the power plant is provided with an inclined guide portion, and the inclined guide portion is inclined so as to guide the steering gear box downward after the support unit is broken by the impact load.

Accordingly, the steering gear box can be reliably dropped to a position below the power plant and the sub-frame by the impact load.

BRIEF DESCRIPTION OF THE DRAWINGS

The advantages of the disclosure will become apparent in the following description taken in conjunction with the following drawings.

DETAILED DESCRIPTION

The best mode for carrying out the present disclosure will now be described with reference to the accompanying drawings. Here, front (Fr), rear (Rr), left (L), and right (R) are directions with respect to the driver.

A vehicle front structure 12 according to an embodiment will now be described.

Figure 1:
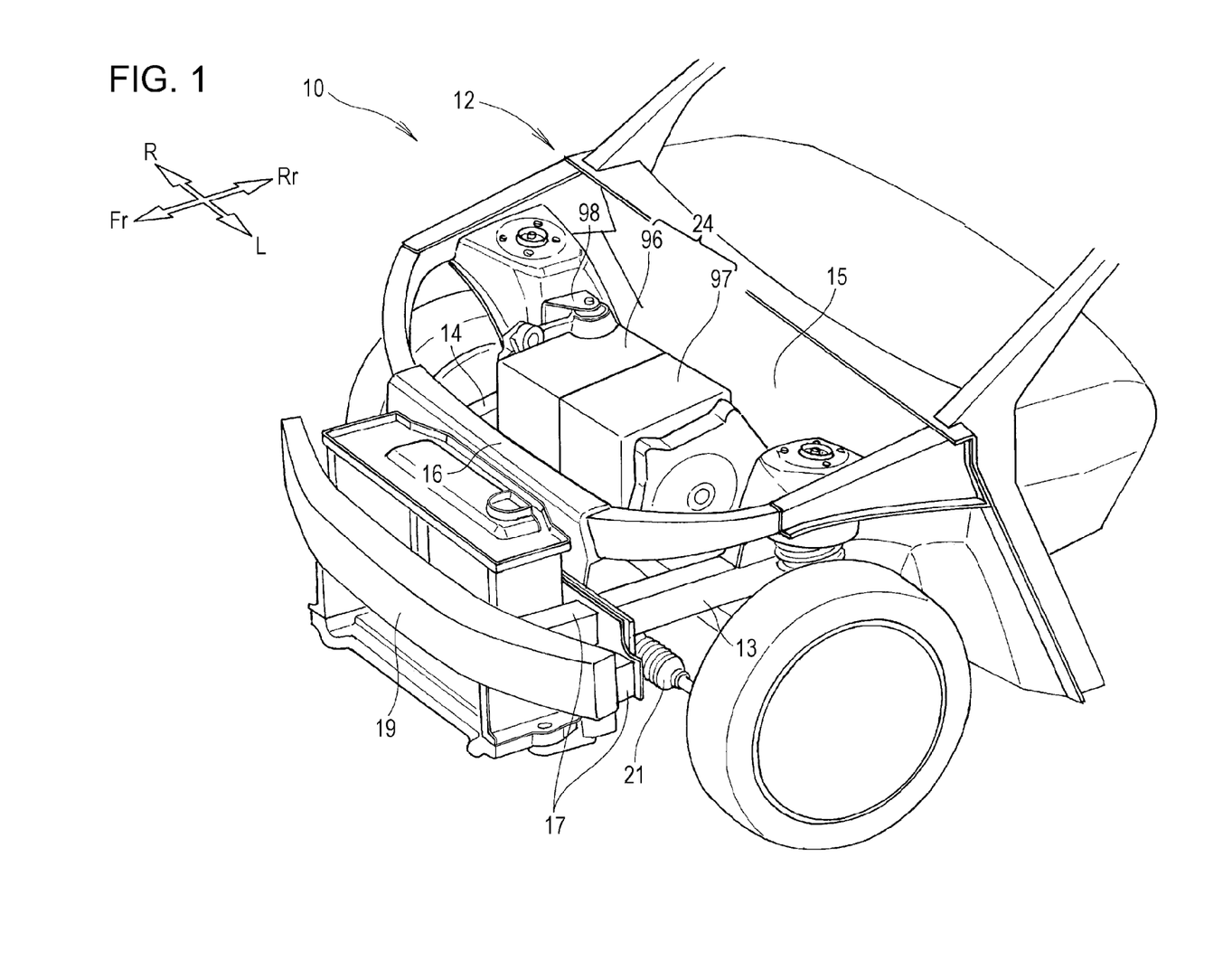
FIG. 1 is a perspective view illustrating a vehicle front structure according to an embodiment of the present disclosure.
Figure 2:
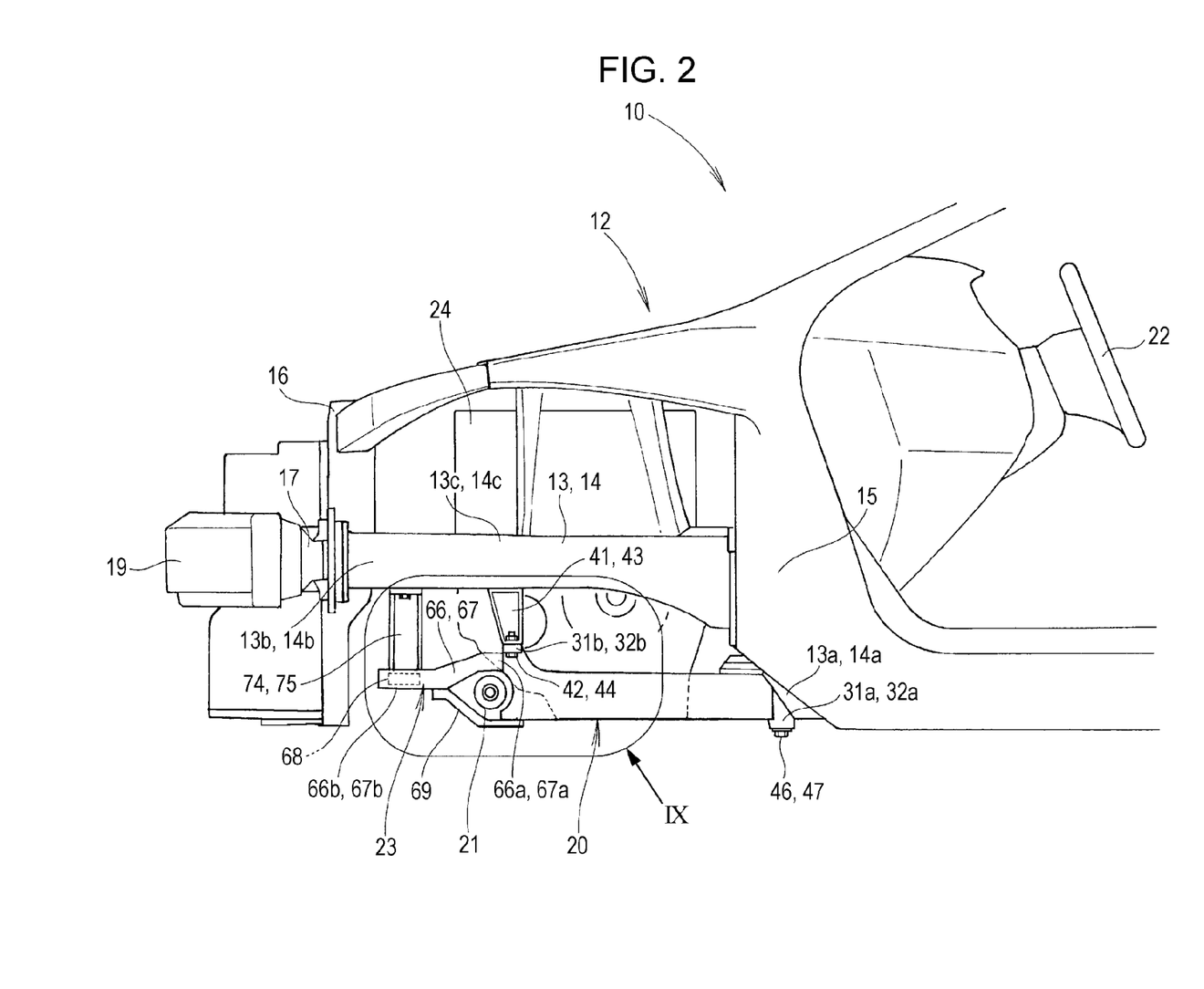
FIG. 2 is a side view of the vehicle front structure illustrated in FIG. 1.

As illustrated in FIGS. 1 and 2, a vehicle 10 includes the vehicle front structure 12, which constitutes a front section of the vehicle 10.

Figure 3:
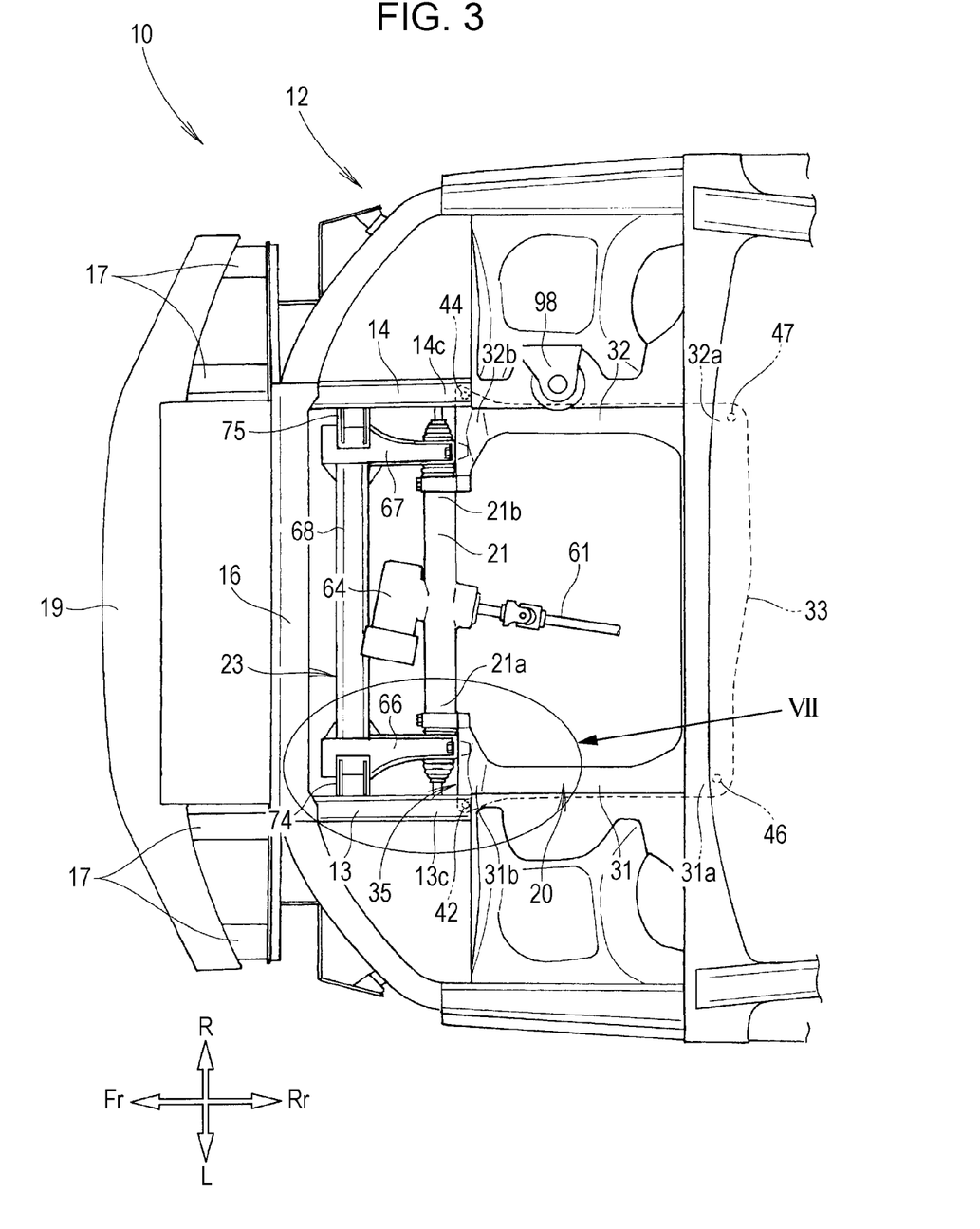
FIG. 3 is a plan view of the vehicle front structure illustrated in FIG. 1 in the state in which a power plant is removed.

The vehicle front structure 12 includes left and right side frames 13 and 14 arranged in the front section of the vehicle 10; a dashboard 15 provided on rear end portions 13a and 14a of the left and right side frames 13 and 14; a front bulkhead 16 provided on front end portions 13b and 14b of the left and right side frames 13 and 14; and a front bumper 19 connected to the front end portions 13b and 14b of the left and right side frames 13 and 14 by left and right connecting members 17 (see also FIG. 3).

The vehicle front structure 12 further includes a sub-frame 20 disposed below the left and right side frames 13 and 14; a steering gear box 21 provided on a front end portion of the sub-frame 20; a steering wheel 22 connected to the steering gear box 21; a support member 23 provided on the front end portion of the sub-frame 20; and a power plant 24 that extends to a region above the sub-frame 20.

Figure 4:
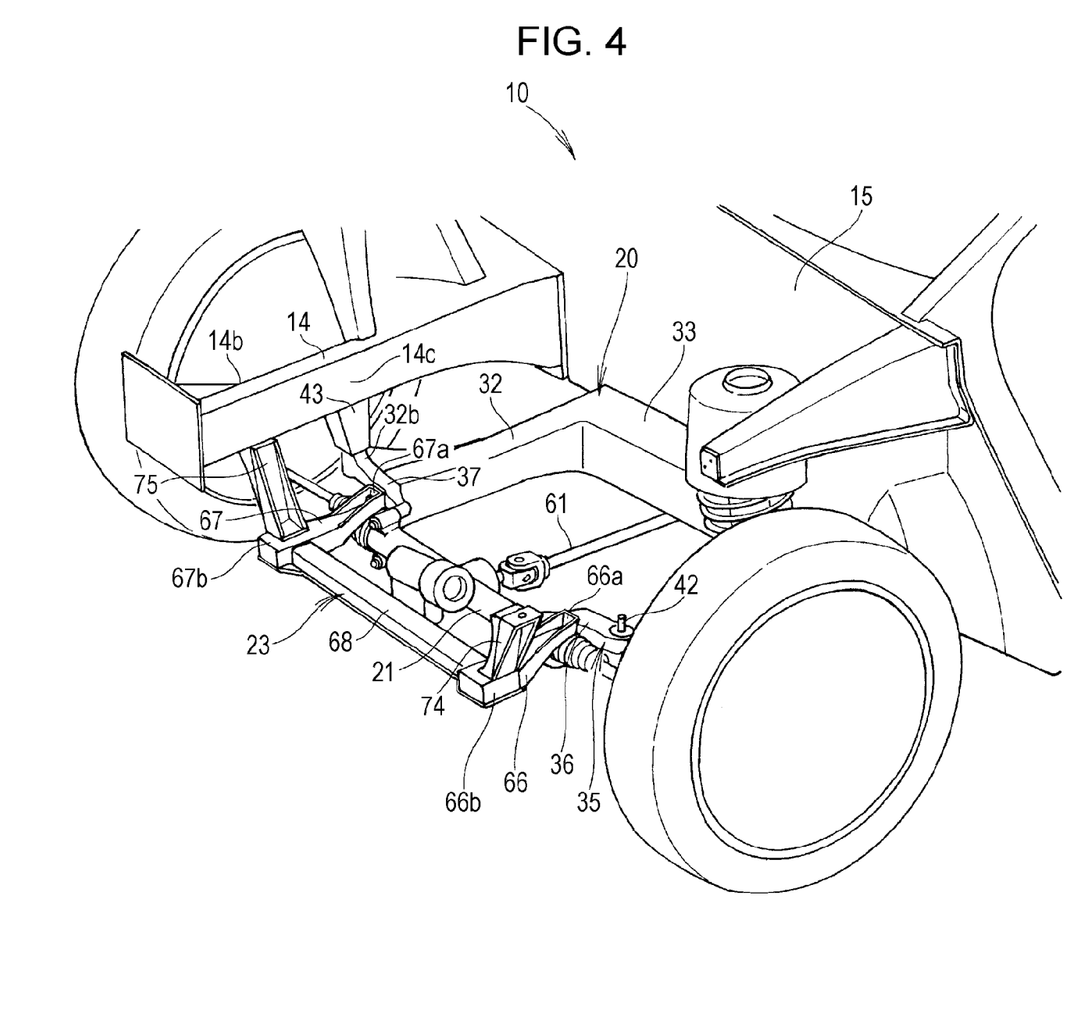
FIG. 4 is a perspective view of the vehicle front structure illustrated in FIG. 1 in the state in which the power plant and other components are removed.

Referring to FIGS. 3 and 4, the sub-frame 20 is formed by, for example, casting using an aluminum alloy.

The sub-frame 20 includes left and right side members 31 and 32 that extend in a vehicle front-rear direction; a cross member 33 which connects rear end portions 31a and 32a of the left and right side members 31 and 32, respectively, and a support unit 35 provided on front end portions 31b and 32b of the left and right side members 31 and 32, respectively.

The rear end portion 31a of the left side member 31 is "a vehicle-rear-side portion of the left side member 31". The rear end portion 32a of the right side member 32 is "a vehicle-rear-side portion of the right side member 32".

The left and right side members 31 and 32 and the cross member 33 of the sub-frame 20 form a substantially angular U shape in plan view.

The front end portion 31b of the left side member 31 is attached to a bottom end portion of a left leg portion 41 (see FIG. 2) with a bolt 42. A top end portion of the left leg portion 41 is attached to a central portion 13c of the left side frame 13.

Thus, the front end portion 31b of the left side member 31 is connected to the central portion 13c of the left side frame 13 by the left leg portion 41.

Similarly, the front end portion 32b of the right side member 32 is attached to a bottom end portion of a right leg portion 43 with a bolt 44. A top end portion of the right leg portion 43 is attached to a central portion 14c of the right side frame 14.

Thus, the front end portion 32b of the right side member 32 is connected to the central portion 14c of the right side frame 14 by the right leg portion 43.

The rear end portion 31a of the left side member 31 is connected to the rear end portion 13a of the left side frame 13 with a bolt 46. Similarly, the rear end portion 32a of the right side member 32 is connected to the rear end portion 14a of the right side frame 14 with a bolt 47.

Figure 5:
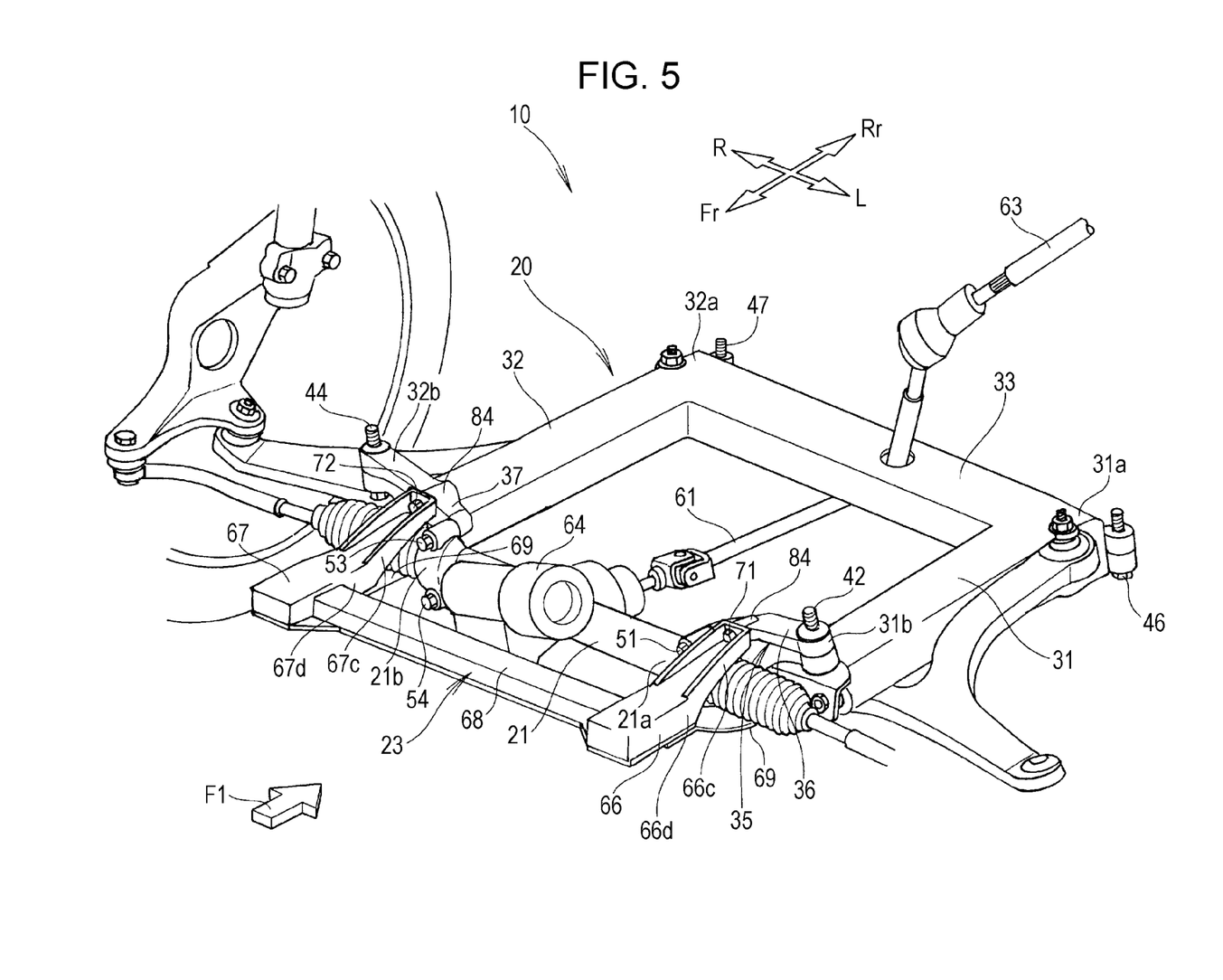
FIG. 5 is a perspective view of a relevant part of the vehicle front structure illustrated in FIG. 4.
Figure 6:
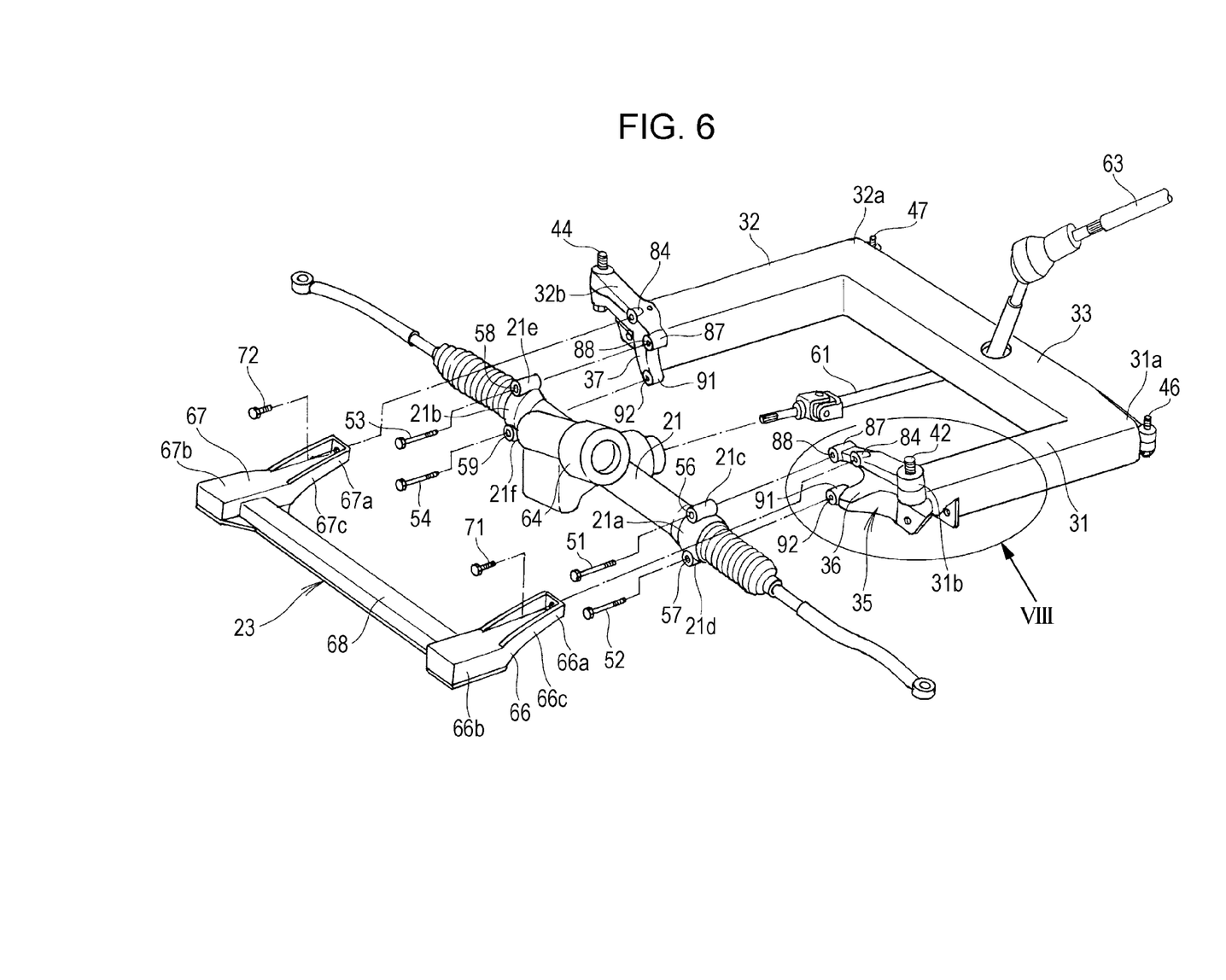
FIG. 6 is an exploded perspective view of the vehicle front structure illustrated in FIG. 5.

As illustrated in FIGS. 5 and 6, the support unit 35 includes a left support portion (left stiffener) 36 that extends inward in a vehicle width direction from the front end portion 31b of the left side member 31, and a right support portion (right stiffener) 37 that extends inward in the vehicle width direction from the front end portion 32b of the right side member 32.

A left end portion 21a of the steering gear box 21 is attached to the left support portion 36 with an upper bolt 51 and a lower bolt 52. Similarly, a right end portion 21b of the steering gear box 21 is attached to the right support portion 37 with an upper bolt 53 and a lower bolt 54.

In other words, the steering gear box 21 is supported on the front end portions 31b and 32b of the left and right side members 31 and 32, respectively, by the support unit 35.

The steering gear box 21 is a rigid component. Therefore, the steering gear box 21 may be used as a front cross member of the sub-frame 20.

Accordingly, the front cross member can be omitted from the sub-frame 20, and the weight of the vehicle 10 can be reduced.

The steering gear box 21 is a cylindrical casing that houses a steering gear (not shown).

An upper attachment portion 21c and a lower attachment portion 21d are formed at the top and bottom, respectively, of the left end portion 21a of the steering gear box 21. An upper through hole 56 that extends in the vehicle front-rear direction is formed in the upper attachment portion 21c, and a lower through hole 57 that extends in the vehicle front-rear direction is formed in the lower attachment portion 21d.

The upper bolt 51 and the lower bolt 52 are inserted through the upper through hole 56 and the lower through hole 57, respectively.

An upper attachment portion 21e and a lower attachment portion 21f are formed at the top and bottom, respectively, of the right end portion 21b of the steering gear box 21. An upper through hole 58 that extends in the vehicle front-rear direction is formed in the upper attachment portion 21e, and a lower through hole 59 that extends in the vehicle front-rear direction is formed in the lower attachment portion 21f.

The upper bolt 53 and the lower bolt 54 are inserted through the upper through hole 58 and the lower through hole 59, respectively.

A connecting shaft 61 extends from the steering gear box 21 toward the vehicle rear end. A steering shaft 63 is connected to a rear end portion of the connecting shaft 61.

The steering wheel 22 (see FIG. 2) is attached to a rear end portion of the steering shaft 63.

A power assist mechanism 64, such as an electric motor, is provided on a vehicle-front-side portion of the steering gear box 21 in a substantially central region thereof in the vehicle width direction. The power assist mechanism 64 is a mechanism for increasing an operating force when the steering wheel 22 is operated.

The support member 23 is attached to the left and right support portions 36 and 37.

The support member 23 includes a left connection arm 66, a right connection arm 67, and a connection member 68. A rear end portion 66a of the left connection arm 66 is attached to the left support portion 36 (load receiving portion 84) with a bolt 71. A rear end portion 67a of the right connection arm 67 is attached to the right support portion 37 (load receiving portion 84) with a bolt 72. The connection member 68 connects front end portions 66b and 67b of the left and right connection arms 66 and 67, respectively.

A rear portion 66c of the left connection arm 66 is upwardly inclined so as to extend around an upper portion of the left end portion 21a of the steering gear box 21.

Thus, the rear portion 66c of the left connection arm 66 extends around the upper portion of the left end portion 21a and is connected to the left support portion 36 (load receiving portion 84).

A rear portion 67c of the right connection arm 67 is upwardly inclined so as to extend around an upper portion of the right end portion 21b of the steering gear box 21.

Thus, the rear portion 67c of the right connection arm 67 extends around the upper portion of the right end portion 21b and is connected to the right support portion 37 (load receiving portion 84).

Figure 9:
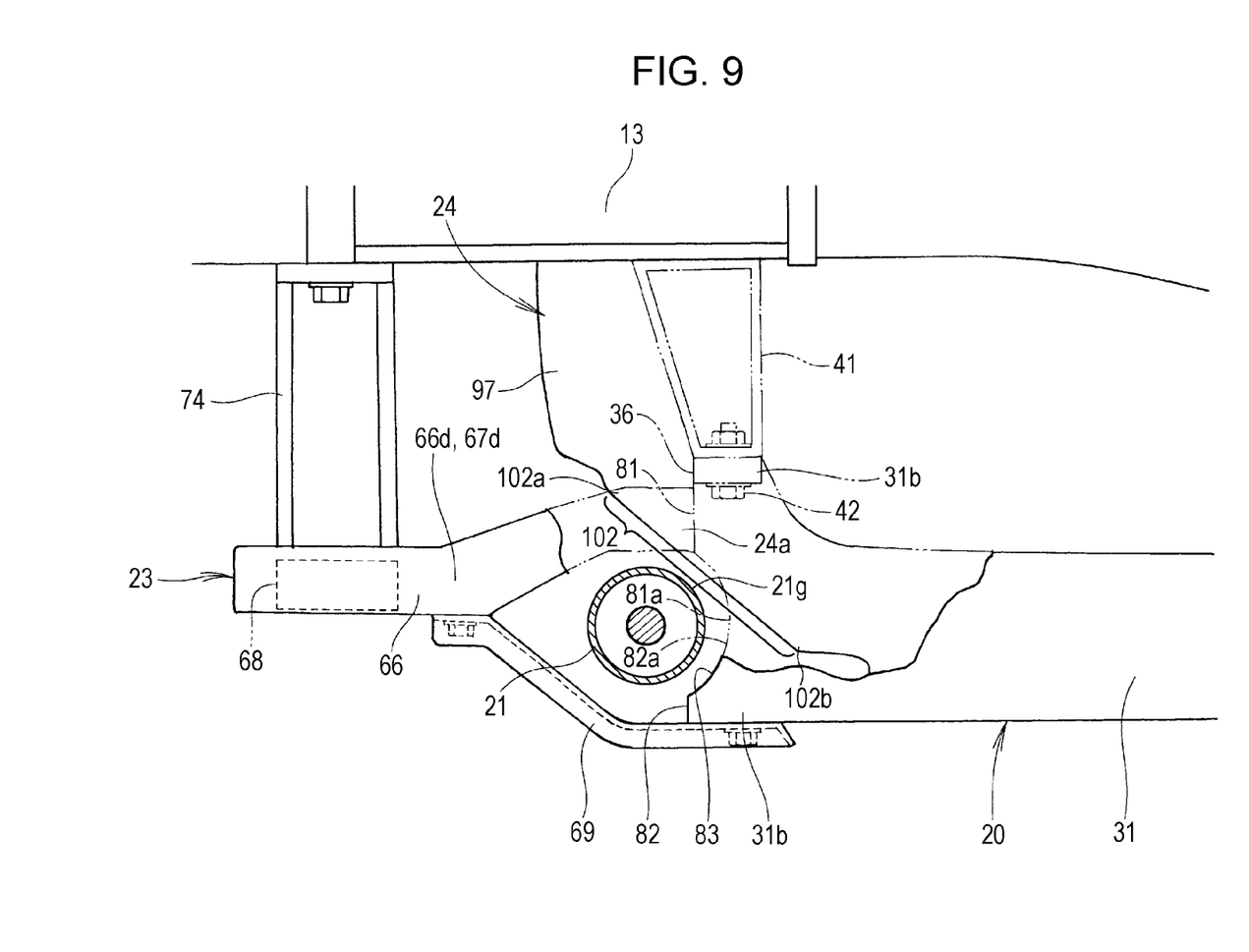
FIG. 9 is an enlarged view of part IX in FIG. 2.

A central portion 66d of the left connection arm 66 is connected to the front end portion 31b of the left side member 31 by a left support bar 69 (see also FIG. 9). A central portion 67d of the right connection arm 67 is connected to the front end portion 32b of the right side member 32 by a right support bar 69.

The connection member 68 extends in the vehicle width direction, that is, along the steering gear box 21, at a location further toward the vehicle front end than the steering gear box 21.

Accordingly, when an impact load F1 is applied to the front section of the vehicle 10, the impact load F1 is applied to the connection member 68 before being applied to the steering gear box 21.

A part of the impact load F1 applied to the connection member 68 is transmitted to the left support portion 36 (load receiving portion 84) through the left connection arm 66. The remaining part of the impact load F1 applied to the connection member 68 is transmitted to the right support portion 37 (load receiving portion 84) through the right connection arm 67.

Thus, the left support portion 36 (the load receiving portion 84 or a portion near the load receiving portion 84) and the right support portion 37 (the load receiving portion 84 or a portion near the load receiving portion 84) can be broken.

Referring to FIGS. 2 and 4 again, the front end portion 66b of the left connection arm 66 is connected to the front end portion 13b of the left side frame 13 by a left front leg portion 74. Similarly, the front end portion 67b of the right connection arm 67 is connected to the front end portion 14b of the right side frame 14 by a right front leg portion 75.

The sub-frame 20 is connected to the rear end portions 66a and 67a of the left and right connection arms 66 and 67, respectively. In addition, the front end portion 66b of the left connection arm 66 is connected to the left side frame 13, and the front end portion 67b of the right connection arm 67 is connected to the right side frame 14.

Thus, the sub-frame 20 is connected to the left and right side frames 13 and 14 by the support member 23 and other parts.

Here, the left and right support portions 36 and 37 are substantially vertically symmetrical to each other. Therefore, components of the left and right support portions 36 and 37 that correspond to each other are denoted by the same reference numerals, and explanations of the right support portion 37 will be omitted.

Figure 7:
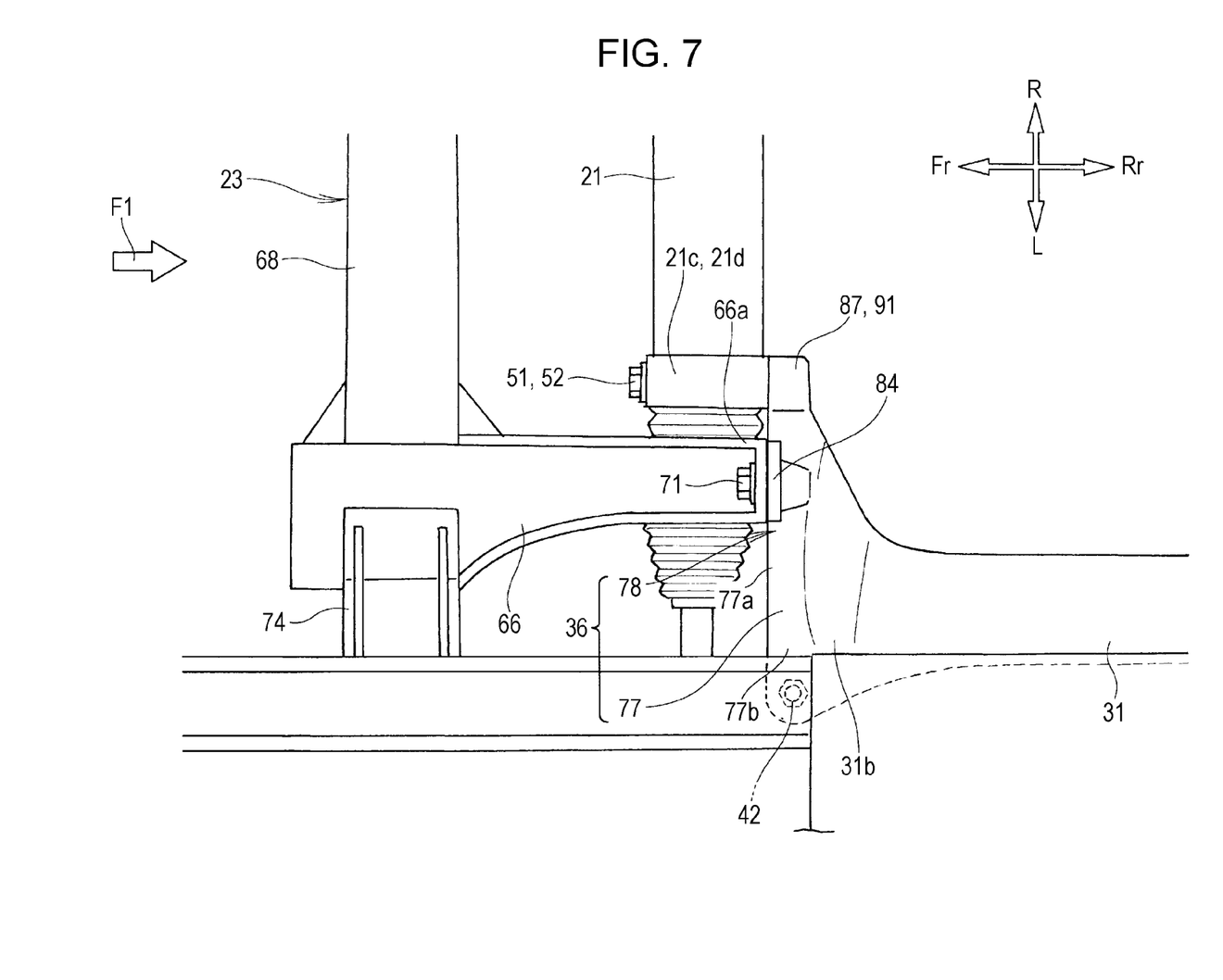
FIG. 7 is an enlarged view of part VII in FIG. 3.
Figure 8:
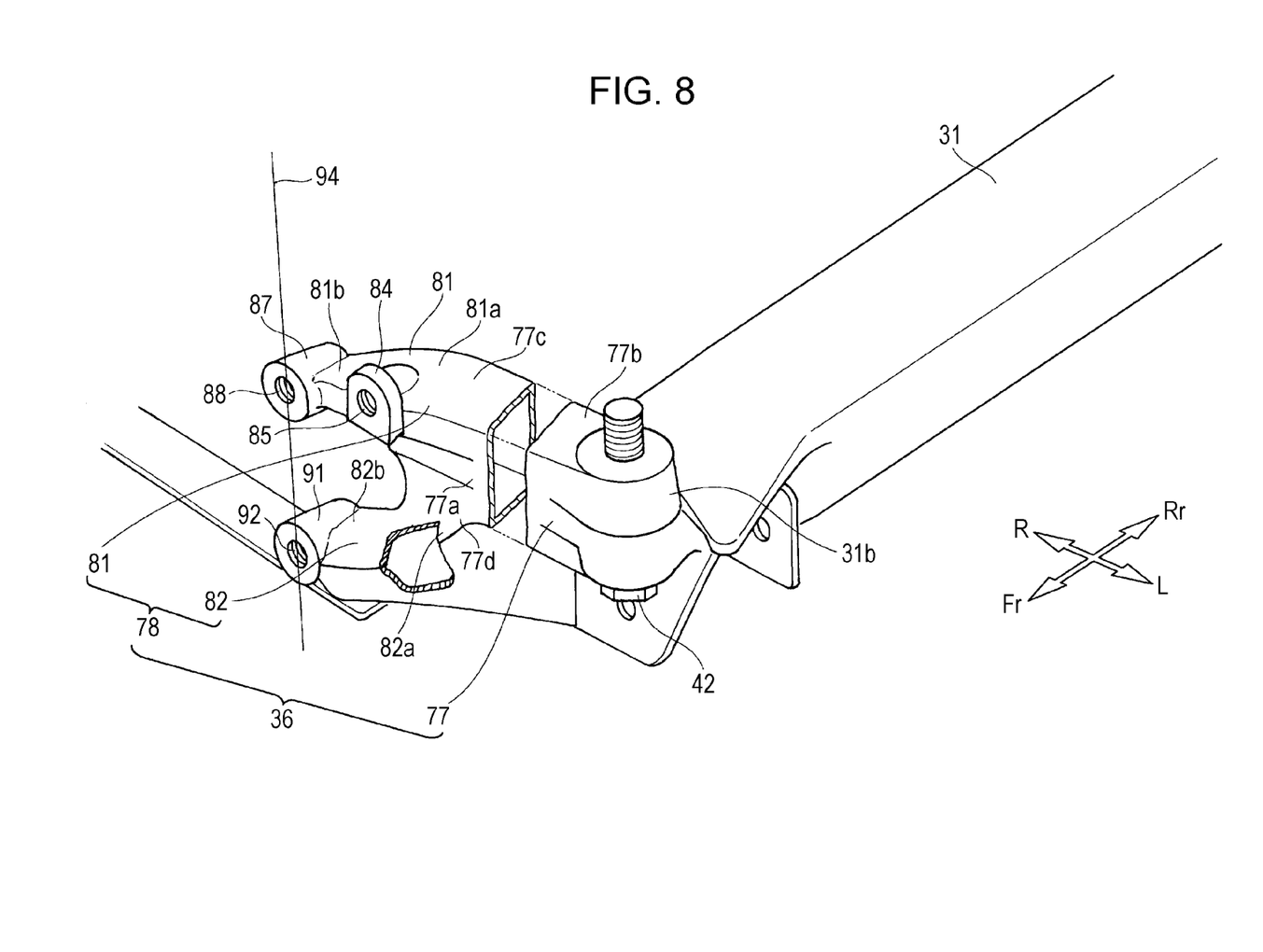
FIG. 8 is an enlarged view of part VIII in FIG. 6.

As illustrated in FIGS. 7 and 8, the left support portion 36 is a hollow component, and includes an arm 77 that extends inward in the vehicle width direction from the front end portion 31b of the left side member 31, and a fork 78 provided on an end portion 77a of the arm 77.

The arm 77 includes a base portion 77b that is integrated with the front end portion 31b of the left side member 31, and extends inward in the vehicle width direction from the front end portion 31b. The arm 77 is a hollow component having a substantially rectangular cross section.

The fork 78 includes an upper branch portion 81 and a lower branch portion 82 that extend from the end portion 77a of the arm 77. The fork 78 has a two-branch structure and includes the upper and lower branch portions 81 and 82.

Since the fork 78 includes the upper and lower branch portions 81 and 82, the cross sections of the upper and lower branch portions 81 and 82 are smaller than that of the arm 77.

The upper branch portion 81 includes an upper base portion 81a that is integrated with an upper portion 77c of the end portion 77a of the arm 77, and extends inward in the vehicle width direction from the upper portion 77c.

The load receiving portion 84 is formed at the top of the upper base portion 81a of the upper branch portion 81. The load receiving portion 84 has a threaded hole 85 that extends in a direction from the vehicle front end to the vehicle rear end.

The bolt 71 is screwed into the threaded hole 85 in the load receiving portion 84, so that the rear end portion 66a of the support member 23 (left connection arm 66) is attached to the load receiving portion 84. The connection member 68 of the support member 23 is attached to the front end portion 66b of the left connection arm 66.

Accordingly, when the impact load F1 is applied to the connection member 68 from the front of the vehicle, a part of the impact load F1 is applied to the load receiving portion 84 through the left connection arm 66.

In other words, the support member 23 is arranged so that the impact load F1 applied thereto from the front of the vehicle can be transmitted to the load receiving portion 84.

An upper gear-box attachment portion (gear-box attachment portion) 87 is formed on an upper end portion 81b of the upper branch portion 81. The upper gear-box attachment portion 87 has an upper threaded hole 88 that extends in the direction from the vehicle front end to the vehicle rear end.

Referring to FIG. 6 again, the upper through hole 56 in the steering gear box 21 (upper attachment portion 21c) is arranged coaxially with the upper threaded hole 88 in the upper gear-box attachment portion 87, and the bolt 51 is inserted through the upper through hole 56 and screwed into the upper threaded hole 88.

Thus, the upper attachment portion 21c of the steering gear box 21 is attached to the upper gear-box attachment portion 87 (see also FIG. 7).

As illustrated in FIG. 8, the lower branch portion 82 includes a lower base portion 82a that is integrated with a lower portion 77d of the end portion 77a of the arm 77, and extends inward in the vehicle width direction from the lower portion 77d.

A lower gear-box attachment portion (gear-box attachment portion) 91 is formed on a lower end portion 82b of the lower branch portion 82. The lower gear-box attachment portion 91 has a lower threaded hole 92 that extends in the direction from the vehicle front end to the vehicle rear end.

Referring to FIG. 6 again, the lower through hole 57 in the steering gear box 21 (lower attachment portion 21d) is arranged coaxially with the lower threaded hole 92 in the lower gear-box attachment portion 91, and the bolt 52 is inserted through the lower through hole 57 and screwed into the lower threaded hole 92.

Thus, the lower attachment portion 21d of the steering gear box 21 is attached to the lower gear-box attachment portion 91.

Thus, as illustrated in FIGS. 7 and 8, the left support portion 36 includes the upper and lower gear-box attachment portions 87 and 91 to which the steering gear box 21 is attached, and the load receiving portion 84 which receives the impact load.

The upper and lower gear-box attachment portions 87 and 91 are arranged on a substantially vertical line 94 that extends in a top-bottom direction, and are located at further inner portion in the vehicle width direction than the left side member 31.

The load receiving portion 84 is also located at further inner portion in the vehicle width direction than the left side member 31.

Thus, the load receiving portion 84 is offset (shifted) from the left side member 31 toward the inside in the vehicle width direction. Accordingly, the impact load applied to the load receiving portion 84 can be efficiently used as a load for breaking the left support portion 36.

In addition, the load receiving portion 84 is located at further outer portion in the vehicle width direction than the upper and lower gear-box attachment portions 87 and 91. More specifically, the load receiving portion 84 and the upper gear-box attachment portion 87 are provided on the upper branch portion 81, and the load receiving portion 84 is located on outer side in the vehicle width direction of the upper gear-box attachment portion 87.

Therefore, when the upper branch portion 81 (that is, the load receiving portion 84 or a portion near the load receiving portion 84) is broken, the upper gear-box attachment portion 87 is reliably separated from the arm 77 (the front end portion 31b of the left side member 31).

Since the fork 78 has a two-branch structure and includes the upper and lower branch portions 81 and 82, the upper and lower branch portions 81 and 82 have smaller cross sections.

Therefore, the upper and lower branch portions 81 and 82 can be appropriately broken by the impact load applied to the load receiving portion 84.

As illustrated in FIGS. 5 and 9, in the state in which the steering gear box 21 is supported by the left and right support portions 36 and 37, the steering gear box 21 is located in a vehicle-front-side region of the power plant 24.

The upper branch portion 81 projects toward the vehicle front end from the upper base portion 81a thereof. Similarly, the lower branch portion 82 projects toward the vehicle front end from the lower base portion 82a thereof.

The upper and lower branch portions 81 and 82 form an arc-shaped accommodating recess 83. A front portion of the steering gear box 21 is accommodated in the accommodating recess 83.

Therefore, the steering gear box 21 may be positioned near the left and right side members 31 and 32 (the rear end portions 31a and 32a.

Thus, the left and right side members 31 and 32 can be efficiently reinforced by the steering gear box 21, and the rigidity of the sub-frame 20 can be increased.

As illustrated in FIG. 1, the power plant 24 is, for example, an engine-transmission unit in which an engine 96 and a transmission 97 (see FIG. 1) are integrated together and which is disposed between the left and right side frames 13 and 14 in a horizontal orientation.

The power plant 24, which is horizontally oriented, is supported on the left side frame 13 with a left attachment bracket (not shown) interposed therebetween, and on the right side frame 14 with a right attachment bracket 98 interposed therebetween.

Referring to FIGS. 5 and 9 again, a lower front portion 24a of the power plant 24 opposes the steering gear box 21, and the lower front portion 24a is provided with an inclined guide portion 102.

The inclined guide portion 102 is formed integrally with a substantially central portion of the lower front portion 24a of the power plant 24, and is inclined downward from a front end 102a thereof to a rear end 102b thereof.

The front end 102a is located above a contact portion 21g of the steering gear box 21, and the rear end 102b is located below the contact portion 21g of the steering gear box 21.

The contact portion 21g of the steering gear box 21 is a portion that comes into contact with the inclined guide portion 102 when the steering gear box 21 moves toward the vehicle rear end.

Since the inclined guide portion 102 is provided on the lower front portion 24a (substantially central portion) of the power plant 24, when the left and right support portions 36 and 37 are broken by the impact load, the support member 23 comes into contact with the steering gear box 21.

Accordingly, the steering gear box 21 moves toward the vehicle rear end, and a substantially central portion of the steering gear box 21 comes into contact with the inclined guide portion 102. Accordingly, the steering gear box 21 is guided downward by the inclined guide portion 102.

Since the steering gear box 21 is guided downward, the steering gear box 21 can be dropped to a position below the power plant 24 and the sub-frame 20.

An example in which the steering gear box 21 is dropped in response to an impact load F2 will now be described with reference to FIGS. 10A to 12. Since the structures at the left and right sides are substantially vertically symmetrical to each other, only the structure at the left side will be described, and explanation of the structure at the right side will be omitted to facilitate understanding of the operation.

Figure 10A:
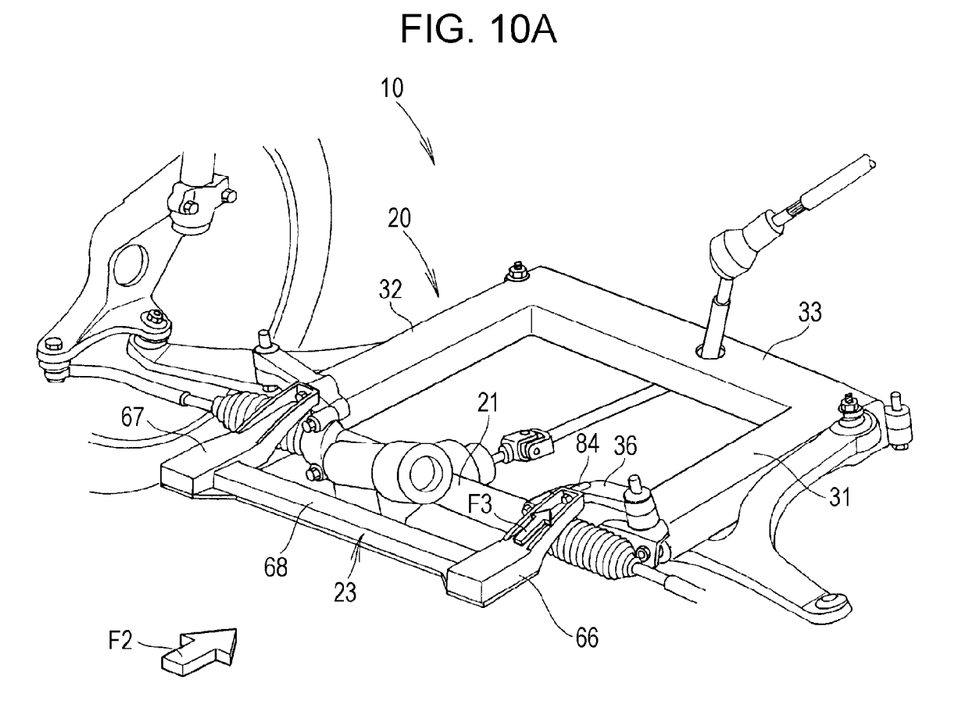
FIGS. 10A and 10B illustrate the manner in which an upper branch portion is broken by an impact load according to the embodiment of the present disclosure.

Referring to FIG. 10A, when a front collision of the vehicle 10 occurs, an impact load F2 is applied to the connection member 68 of the support member 23 from the front of the vehicle. When the impact load F2 is applied to the connection member 68, a part of the impact load F2 is transmitted to the load receiving portion 84 on the left support portion 36 (upper branch portion 81) through the left connection arm 66 as an impact load F3.

Figure 10B:
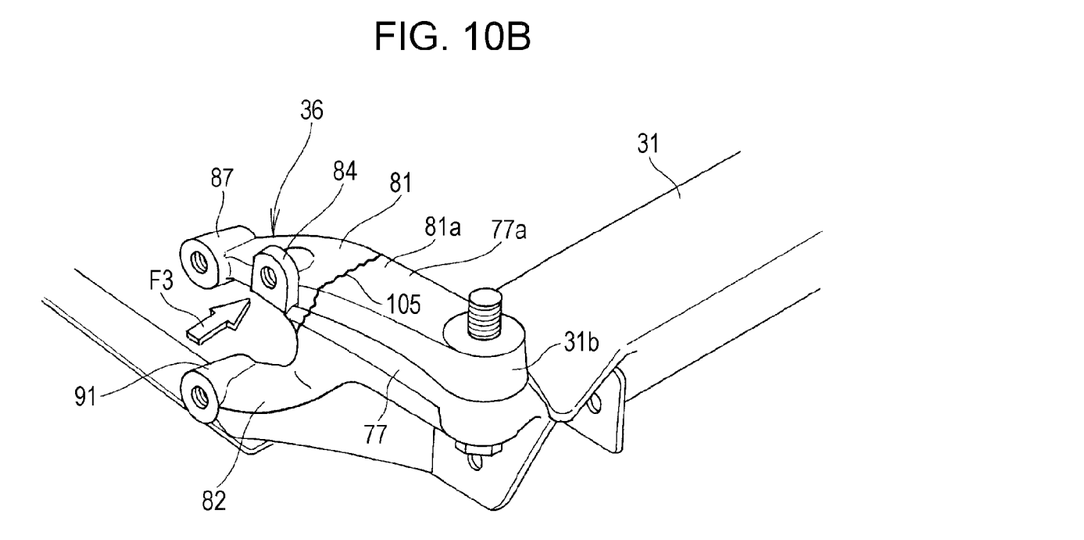

As illustrated in FIG. 10B, since the upper branch portion 81 is branched from the lower branch portion 82, the upper branch portion 81 has a small cross section. In addition, since the load receiving portion 84 is offset from the left side member 31 toward the inside in the vehicle width direction, the impact load F3 applied to the load receiving portion 84 can be efficiently used as a load for breaking the upper branch portion 81. Furthermore, the upper base portion 81a of the upper branch portion 81 is supported by the end portion 77a of the arm 77 at one end thereof.

Accordingly, when the impact load F3 is applied to the load receiving portion 84, a crack 105 is formed in a region around the upper base portion 81a (that is, in the load receiving portion 84 or a portion near the load receiving portion 84), and the upper branch portion 81 is broken in the region around the upper base portion 81a.

Here, the load receiving portion 84 is located on outer side in the vehicle width direction of the upper gear-box attachment portion 87. Therefore, when the upper branch portion 81 is broken in the region around the upper base portion 81a, the upper gear-box attachment portion 87 is reliably separated from the arm 77 (the front end portion 31b of the left side member 31).

Figure 11A:
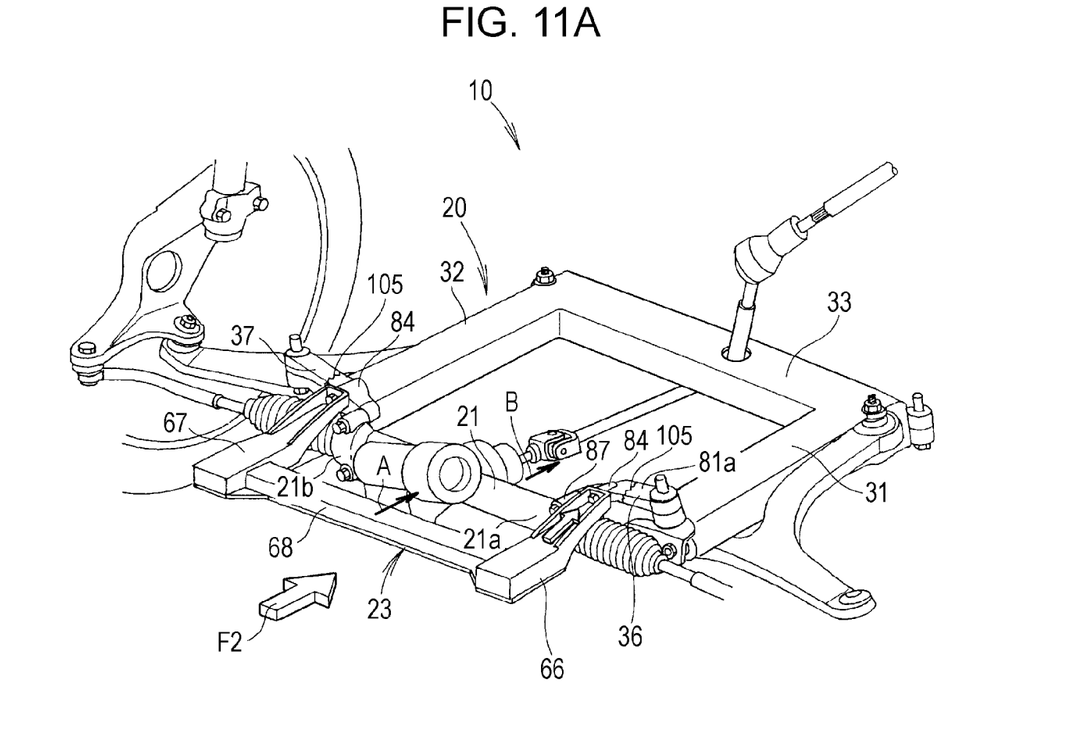
FIGS. 11A and 11B illustrate the manner in which a steering gear box is separated from a sub-frame according to the embodiment of the present disclosure.

As illustrated in FIG. 11A, after the upper branch portion 81 has been broken in the region around the upper base portion 81a, the impact load F2 is continuously applied to the connection member 68. The support member 23 moves toward the vehicle rear end in the direction shown by arrow A, so that the support member 23 (left connection arm 66) comes into contact with the steering gear box 21.

Accordingly, the steering gear box 21 is pushed toward the vehicle rear end by the left connection arm 66, so that the steering gear box 21 moves toward the vehicle rear end in the direction shown by arrow B.

The steering gear box 21 is attached to the upper gear-box attachment portion 87 and the lower gear-box attachment portion 91 (see FIG. 10B).

Therefore, when the steering gear box 21 moves toward the vehicle rear end, an impact load F4 (see FIG. 11B) is applied to the lower gear-box attachment portion 91 of the left support portion 36 (lower branch portion 82).

Figure 11B:
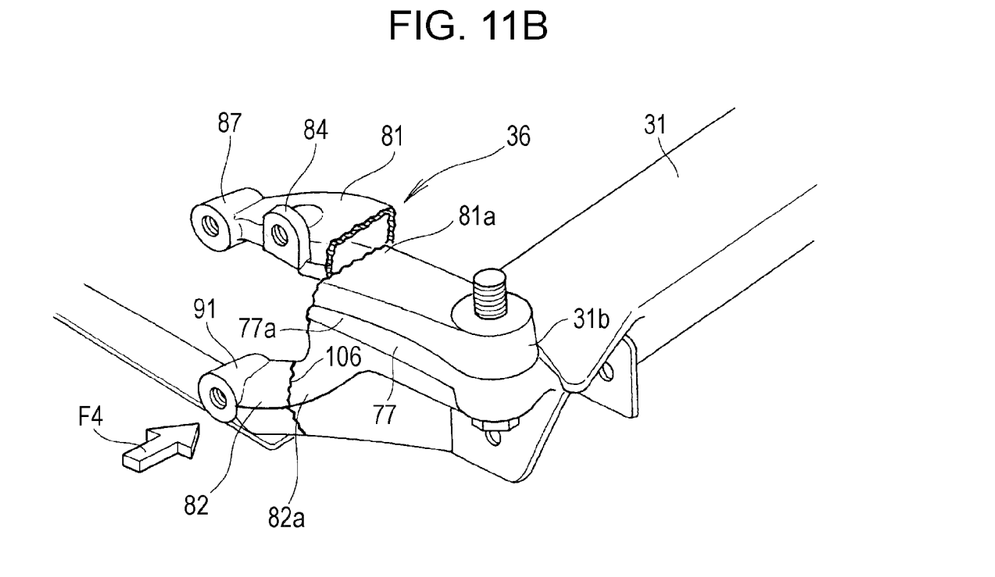

As illustrated in FIG. 11B, since the lower branch portion 82 is branched from the upper branch portion 81, the lower branch portion 82 has a small cross section. In addition, since the lower gear-box attachment portion 91 is offset from the left side member 31 toward the inside in the vehicle width direction, the impact load applied to the lower gear-box attachment portion 91 can be efficiently used as a load for breaking the lower branch portion 82. Furthermore, the lower base portion 82a of the lower branch portion 82 is supported by the end portion 77a of the arm 77 at one end thereof.

Accordingly, when the impact load F4 is applied to the lower gear-box attachment portion 91, a crack 106 is formed in a region around the lower base portion 82a, and the lower branch portion 82 is broken in the region around the lower base portion 82a.

As a result, the left end portion 21a (see FIG. 11A) of the steering gear box 21 becomes separated from the left support portion 36.

Similarly, as illustrated in FIG. 11A, the right end portion 21b of the steering gear box 21 becomes separated from the right support portion 37. Thus, the steering gear box 21 becomes separated from the sub-frame 20.

Figure 12:
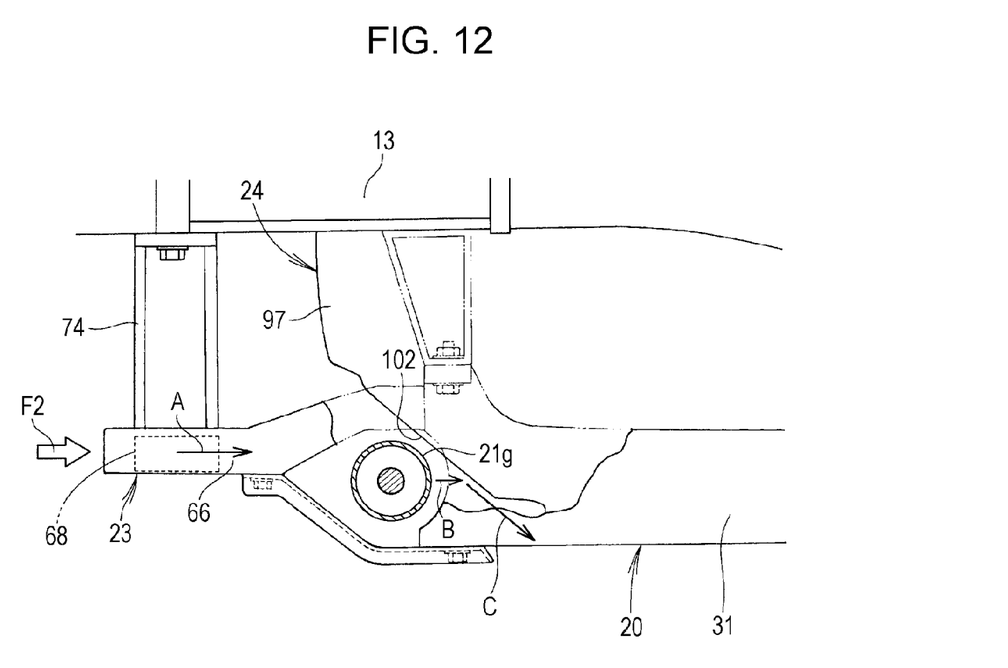
FIG. 12 illustrates the manner in which the steering gear box is dropped according to the embodiment of the present disclosure.

As illustrated in FIG. 12, after the steering gear box 21 has been separated from the sub-frame 20, the impact load F2 is continuously applied to the connection member 68. Therefore, the support member 23 continuously moves toward the vehicle rear end in the direction shown by arrow A.

Here, the support member 23 is connected to the steering gear box 21 by the upper branch portion 81. Therefore, when the support member 23 moves toward the vehicle rear end, the steering gear box 21 moves together with the support member 23 toward the vehicle rear end in the direction shown by arrow B.

When the steering gear box 21 moves toward the vehicle rear end, the contact portion 21g of the steering gear box 21 comes into contact with the inclined guide portion 102 of the power plant 24.

When the contact portion 21g comes into contact with the inclined guide portion 102, the inclined guide portion 102 guides the steering gear box 21 obliquely downward toward the vehicle rear end in the direction shown by arrow C. Thus, the steering gear box 21 can be dropped to a position below the power plant 24 and the sub-frame 20.

Since the steering gear box 21 is dropped, the impact load F2 is not supported by the steering gear box 21. Instead, the impact load F2 can be efficiently transmitted to the power plant 24.

As a result, the power plant 24 can be moved toward the vehicle rear end by a sufficient distance, and the impact load can be sufficiently absorbed.

A case in which the steering gear box 21 is not dropped to a position below the power plant 24 and the sub-frame 20 will now be described as a comparative example.

In the case where the steering gear box 21 is not dropped to a position below the power plant 24 and the sub-frame 20, the movement of the steering gear box 21 toward the vehicle rear end may be blocked by the sub-frame 20.

Accordingly, the impact load F2 may be supported by the steering gear box 21, and it is difficult to efficiently transmit the impact load F2 to the power plant 24.

Thus, in the case where the steering gear box 21 is not dropped, it is difficult to allow the power plant 24 to move toward the vehicle rear end by a sufficient distance, and it is therefore difficult to sufficiently absorb the impact load F2.

The vehicle front structure according to the present disclosure is not limited to the above-described embodiment, and various modifications and improvements are possible.

For example, in the above-described embodiment, the power plant 24 is an engine-transmission unit. However, the power plant 24 is not limited to this, and may instead be another type of power source, such as an electric motor.

In addition, in the above-described embodiment, the inclined guide portion 102 is formed integrally with a lower front portion of the power plant 24. However, the steering gear box 21 may instead have an inclined guide portion that is formed integrally therewith.

Alternatively, a similar effect can be achieved by forming an inclined guide portion as a component separated from the power plant 24 or the steering gear box 21, and attaching the inclined guide portion formed as a separate component to the power plant 24 or the steering gear box 21.

In addition, in the above-described embodiment, the rear end portions 31a and 32a are described as an example of vehicle-rear-side portions of the left and right side members 31 and 32, and the cross member 33 is connected to the rear end portions 31a and 32a. However, the cross member 33 may instead be connected to portions other than the rear end portions 31a and 32a.

In addition, in the above-described embodiment, an example in which the upper branch portion 81 and the lower branch portion 82 are broken by the impact load F2 is described. Alternatively, however, the arm 77 may be broken instead. Also in this case, an effect similar to that of the above-described embodiment can be achieved.

In addition, in the above-described embodiment, the left and right support portions 36 and 37 are composed of hollow components. However, the left and right support portions 36 and 37 may instead be composed of solid components.

In this case, notches or the line may be formed in the left and right support portions 36 and 37, so that the left and right support portions 36 and 37 can be appropriately broken at the positions where the notches or the like are formed.

The shapes and structures of the vehicle, the vehicle front structure, the left and right side frames, the sub-frame, the steering gear box, the support member, the power plant, the left and right side members, the cross member, the support unit, the left and right support portions, the connection member, the load receiving portion, the upper and lower gear-box attachment portions, and the inclined guide portion described above in the embodiment are not limited to those in the embodiment, and may be modified as appropriate.

The present disclosure may be suitably applied to a vehicle having a vehicle front structure in which a steering gear box is provided on a sub-frame and in which a power plant extends to a region above the sub-frame. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle front structure comprising:
   left and right side frames extending in a vehicle longitudinal direction;
   a sub-frame disposed below the left and right side frames;
   a steering gear box provided on the sub-frame, the steering gear box extending in a vehicle width direction; and
   a power plant disposed above the sub-frame,
   wherein the sub-frame includes
      left and right side members extending in the vehicle longitudinal direction,
      a cross member connecting the left and right side members and disposed at a rear portion of each of the left and right side members, and
      left and right support units, each extending from a front end portion of corresponding one of the left and right side members inward in the vehicle width direction, the steering gear box being connected to each of the left and right support units such that the steering gear box is disposed in front direction of the front end portions of the left and right side members and the respective front end portions of the left and right side members are linked with each other by the steering gear box, the support units supporting the steering gear box at a front end portion of each of the left and right side members such that the steering gear box is located in front of the power plant, and
   wherein the support units are capable of being broken by an impact load so that the steering gear box is dropped when the impact load is applied.

2. The vehicle front structure according to claim 1, wherein each of the left and right support units includes a gear-box attachment portion to which the steering gear box is attached and a load receiving portion which receives the impact load, the gear-box attachment portion and the load receiving portion being located on an inner side in the vehicle width direction of the respective left and right side members on which the support units are provided, and
   wherein each of the left and right support units are broken by the impact load applied to the load receiving portion.

3. The vehicle front structure according to claim 2, wherein the load receiving portion is located on an outer side in the vehicle width direction of the gear-box attachment portion.

4. The vehicle front structure according to claim 2, further comprising:
   a support member connected to the respective load receiving portions such that the impact load is transmittable to the respective load receiving portions,
   wherein the support member includes a connection bar located in front of the steering gear box and extends in the vehicle width direction.

5. The vehicle front structure according to claim 4, wherein the support member includes a pair of arm members each connected to a front side of corresponding one of the load receiving portions, and
   the connection bar connects the arm members.

6. The vehicle front structure according to claim 5, wherein each of the pair of arm members includes an inclined guide member extending forward from the front side of the corresponding one of the load receiving portions over the steering gear box located in front of the corresponding one of the load receiving portions.

7. The vehicle front structure according to claim 6, wherein each of the pair of arm members includes a front end portion disposed in front of the steering gear box and connected to the inclined guide member.

8. The vehicle front structure according to claim 2, wherein the left and right support units are hollow members, respectively.

9. The vehicle front structure according to claim 1, wherein the steering gear box or the power plant is provided with an inclined guide portion, and
   wherein the inclined guide portion is inclined so as to guide the steering gear box downward after the support units are broken by the impact load.

10. The vehicle front structure according to claim 9, wherein the steering gear box includes a rear surface facing the power plant, the rear surface being inclined to a front of a vehicle.

11. The vehicle front structure according to claim 9, wherein the power plant includes a front surface facing the steering gear box, the front surface being inclined to a front of a vehicle.

12. A vehicle front structure comprising:
   left and right side frames extending in a vehicle longitudinal direction;
   a sub-frame disposed below the left and right side frames;
   a steering gear box provided on the sub-frame; and
   a power plant disposed above the sub-frame,
   wherein the sub-frame includes left and right side members extending in the vehicle longitudinal direction, a cross member connecting the left and right side members and disposed at a rear portion of each of the left and right side members, and a support unit supporting the steering gear box at a front end portion of each of the left and right side members such that the steering gear box is located in front of the power plant, wherein the support unit is capable of being broken by an impact load so that the steering gear box is dropped when the impact load is applied, wherein the support unit includes left and right support portions extending inward in a vehicle width direction from the respective front end portions of the left and right side members, wherein each of the left and right support portions includes a gear-box attachment portion to which the steering gear box is attached and a load receiving portion which receives the impact load, the gear-box attachment portion and the load receiving portion being located on an inner side in the vehicle width direction of the respective left and right side members on which the support portion is provided, and wherein each of the left and right support portions is broken by the impact load applied to the load receiving portion.

13. The vehicle front structure according to claim 12, wherein the load receiving portion is located on an outer side in the vehicle width direction of the gear-box attachment portion.

14. The vehicle front structure according to claim 12, further comprising:

a support member connected to the respective load receiving portions such that the impact load is transmittable to the respective load receiving portions, wherein the support member includes a connection bar located in front of the steering gear box and extends in the vehicle width direction.

15. The vehicle front structure according to claim 14, wherein the support member includes a pair of arm members each connected to a front side of corresponding one of the load receiving portions, and the connection bar connects the arm members.

16. The vehicle front structure according to claim 15, wherein each of the pair of arm members includes an inclined guide member extending forward from the front side of the corresponding one of the load receiving portions over the steering gear box located in front of the corresponding one of the load receiving portions.

17. The vehicle front structure according to claim 16, wherein each of the pair of arm members includes a front end portion disposed in front of the steering gear box and connected to the inclined guide member.

18. The vehicle front structure according to claim 12, wherein the left and right support portions are hollow members, respectively.

19. A vehicle front structure comprising:

left and right side frames extending in a vehicle longitudinal direction;

a sub-frame disposed below the left and right side frames;

a steering gear box provided on the sub-frame; and a power plant disposed above the sub-frame, wherein the sub-frame includes left and right side members extending in the vehicle longitudinal direction, a cross member connecting the left and right side members and disposed at a rear portion of each of the left and right side members, and a support unit supporting the steering gear box at a front end portion of each of the left and right side members such that the steering gear box is located in front of the power plant, wherein the support unit is capable of being broken by an impact load so that the steering gear box is dropped when the impact load is applied, wherein the steering gear box or the power plant is provided with an inclined guide portion, and wherein the inclined guide portion is inclined so as to guide the steering gear box downward after the support unit is broken by the impact load.

20. The vehicle front structure according to claim 19, wherein the steering gear box includes a rear surface facing the power plant, the rear surface being inclined to a front of a vehicle.

21. The vehicle front structure according to claim 19, wherein the power plant includes a front surface facing the steering gear box, the front surface being inclined to a front of a vehicle.

* * * * *